United States Patent
Nayak et al.

(10) Patent No.: US 11,315,020 B2
(45) Date of Patent: Apr. 26, 2022

(54) OPTIMIZED PARTITIONING OF MULTI-LAYER NETWORKS IN CORE-BASED NEUROSYNAPTIC ARCHITECTURES

(71) Applicant: INTERNATIONAL BUSINESS MACHINES CORPORATION, Armonk, NY (US)

(72) Inventors: Tapan K. Nayak, San Jose, CA (US); Arnon Amir, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 853 days.

(21) Appl. No.: 16/140,489

(22) Filed: Sep. 24, 2018

(65) Prior Publication Data
US 2020/0097821 A1 Mar. 26, 2020

(51) Int. Cl.
*G06N 3/08* (2006.01)
*G06N 3/04* (2006.01)
*G06N 3/063* (2006.01)

(52) U.S. Cl.
CPC ............. *G06N 3/082* (2013.01); *G06N 3/049* (2013.01); *G06N 3/063* (2013.01)

(58) Field of Classification Search
CPC .... G06N 3/0445; G06N 3/0454; G06N 3/049; G06N 3/063; G06N 3/082; G06N 3/084; G06N 5/003
See application file for complete search history.

(56) References Cited

U.S. PATENT DOCUMENTS

| | | | |
|---|---|---|---|
| 9,104,973 B2 | 8/2015 | Izhikevich et al. | |
| 2016/0364644 A1 | 12/2016 | Brothers et al. | |
| 2017/0169326 A1* | 6/2017 | Diamos | G06N 3/063 |
| 2017/0277658 A1 | 9/2017 | Pratas et al. | |
| 2018/0260682 A1* | 9/2018 | Amir | G06N 3/063 |
| 2018/0260690 A1* | 9/2018 | Young | G06N 3/04 |

OTHER PUBLICATIONS

Lombardi et al., "Empirical decision model learning", Mar. 2017, Artificial Intelligence, vol. 244, pp. 343-367 (Year: 2017).*
Anonymous, "System and Method for Minimum Hamming Distance Discovery Using Neuromorphic Hardware," IP.com (2016).
Choi et al., "Co-Training of Feature Extraction and Classification using Partitioned Convolutional Neural Networks," Pennsylvania State University, (2017).
Esser et al., "Convolutional Networks for Fast, Energy-Efficient Neuromorphic Computing," IBM Research, 1-7 (2016).

* cited by examiner

*Primary Examiner* — Brent Johnston Hoover
(74) *Attorney, Agent, or Firm* — Erik A. Huestis; Stephen J. Kenny; Foley Hoag, LLP

(57) ABSTRACT

Hardware optimization of neural networks is provided. In various embodiments, an output-induced receptive field of each of a plurality of layers of a neural network is determined. From each of the plurality of layers any portions of their respective input that falls outside their respective output-induced receptive field are trimmed. For each of the plurality of layers, a plurality of mappings of the layer to physical neurosynaptic cores are determined. A mapping is determined having a minimum total number of cores required for the neural network based on the plurality of mappings.

17 Claims, 13 Drawing Sheets

FIG. 6

OPTIMIZED PARTITIONING OF MULTI-LAYER NETWORKS IN CORE-BASED NEUROSYNAPTIC ARCHITECTURES

BACKGROUND

Embodiments of the present disclosure relate to hardware optimization of neural networks, and more specifically, to optimized partitioning of multi-layer networks in core-based neurosynaptic architectures.

BRIEF SUMMARY

According to embodiments of the present disclosure, methods of and computer program products for hardware optimization of neural networks are provided. An output-induced receptive field of each of a plurality of layers of a neural network is determined. From each of the plurality of layers any portions of their respective input that falls outside their respective output-induced receptive field are trimmed. For each of the plurality of layers, a plurality of mappings of the layer to physical neurosynaptic cores are determined. A mapping is determined having a minimum total number of cores required for the neural network based on the plurality of mappings.

BRIEF DESCRIPTION OF THE SEVERAL VIEWS OF THE DRAWINGS

FIG. 6 depicts an exemplary optimized layout of a plurality of convolutional neural network layers according to embodiments of the present disclosure.

DETAILED DESCRIPTION

Figure 1:
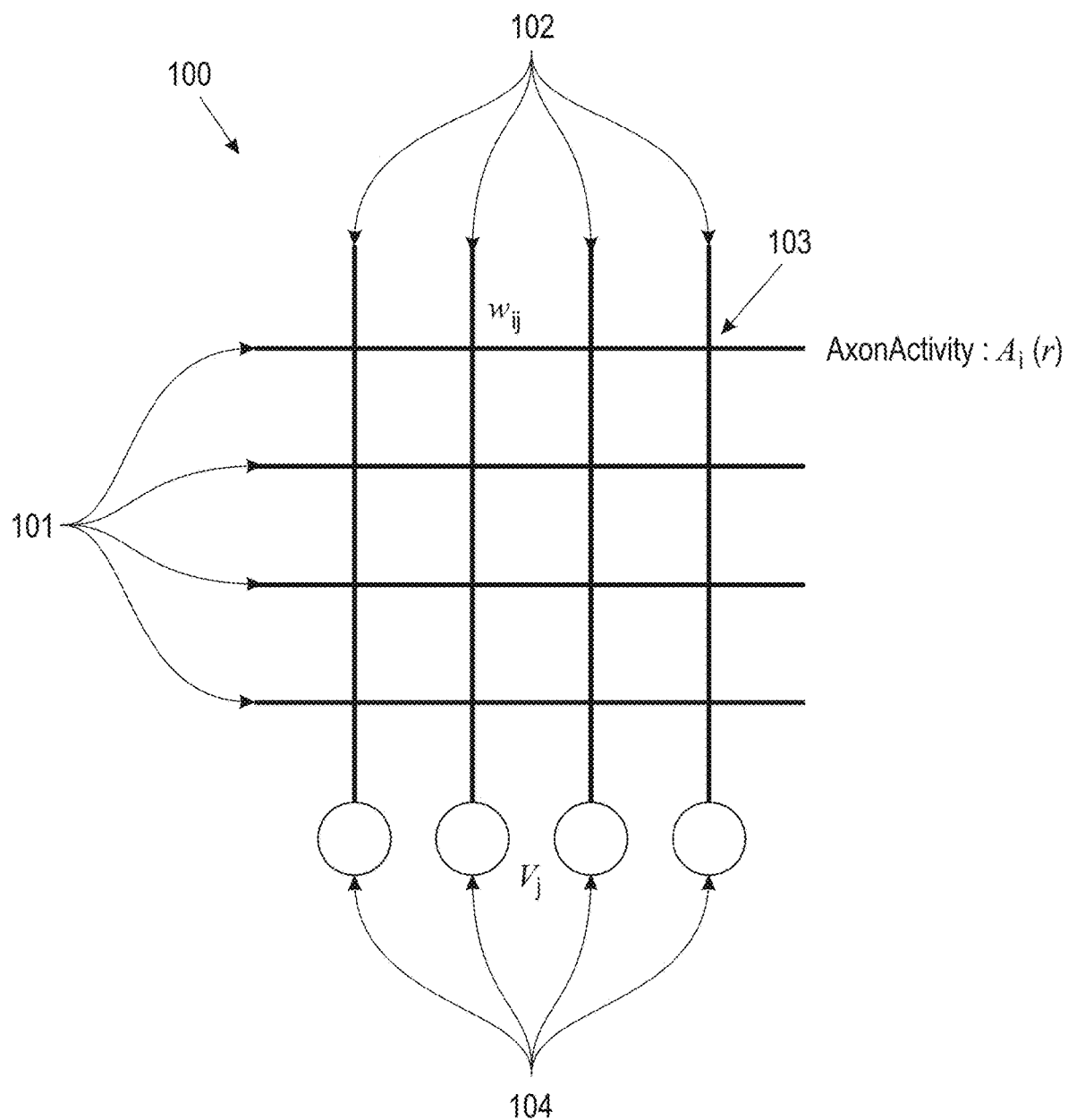
FIG. 1 depicts a neurosynaptic core according to embodiments of the present disclosure.

Deep neural networks, and in particular deep convolutional neural networks (CNN), are important to the machine learning landscape. CNNs are useful for various Artificial Intelligence (AI) applications in machine learning, including: object recognition, classification, detection, tracking, segmentation, learning of complex mapping functions in various domains, decision making, prediction, adaptation and more. CNNs have applications in numerous commercial fields such as retail, security and surveillance, healthcare, business intelligence, advertisement, marketing, social networks, data centers administration, autonomous driving, and many more.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A convolution layer exploits spatially local correlations in natural sensor data by enforcing a local connectivity pattern between neurons in adjacent layers: each neuron receives connections from only a small region of the input data tensor. The extent of this connectivity is called the receptive field of the neuron. All neurons that compute elements of the same output feature share the same set of weights and activation function parameters, called a filter, with a local receptive field. The size of a filter is fixed, irrespective of input size, so a convolution layer has far fewer free parameters than a fully connected layer with the same input and output dimensions, and a correspondingly smaller memory footprint.

For example, in a spatial convolution layer, each filter's receptive field covers only a fraction of the height and width of the input data tensor, but extends through the full feature depth. Such an architecture ensures that the filters produce the strongest response to a spatially local input pattern. The layer computes its output by convolving each filter across the width and height of the input data tensor, computing the dot product between the entries of the filter and the input data tensor at each location to produce a 2-dimensional activation map for each filter.

Stacking the feature maps for all filters forms the full output data tensor for the convolution layer. Every element in the output data tensor can thus also be interpreted as an output of a neuron that looks at a small region in the input and shares filter parameters with neurons in the same output feature map.

It will be appreciated that the size of a convolution layer's output data tensor is a function of the size of the input data tensor, the size of the filters, and the stride with which the filters are applied to the input data tensor. The stride parameters stride_a, stride_b, and stride_c define the distance between each filter application, a value of 1 signifying that each filter application is shifted one pixel along the relevant dimension of the input data tensor. Larger stride values reduce the computational load by computing only a subset of the possible output pixels.

It will further be appreciated that in various convolutions, zero padding may be applied to the input data tensor in order to vary the output data tensor size relative to the input data tensor size, for example to make those sizes equal. Padding may be omitted in various examples for simplicity of explanation, but it will be apparent that padding may be included in various embodiments without departing from the scope of the present disclosure.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

As noted above, in some embodiments an EEDN (Energy-Efficient Deep Neuromorphic networks) based classifier is used. EEDN is described more fully in *Convolutional Networks for Fast, Energy-Efficient Neuromorphic Computing*; Esser, et al., arXiv:1603.08270v2 (https://arxiv.org/pdf/1603.08270.pdf), which is hereby incorporated by reference. EEDN provides a deep convolutional neural network suited for deployment on spike-based neuromorphic processors such as TrueNorth.

Given a User-Specified EEDN network (layers configuration) and input image dimensions, it is desirable to determine a mapping of the network to a core-based model such as TrueNorth using the least number of cores necessary to implement the specified EEDN computation. In various embodiments while computation remains the same, the underlying network topology may change.

It will be appreciated that while various examples provided herein are given in terms of EEDN, the present disclosure is generally applicable to other networks, including recurrent networks. Likewise, although various examples are given in terms of TrueNorth, the present disclosure is generally applicable to other core-based neuromorphic hardware.

By optimizing the number of cores required for a CNN layout on chip, the present disclosure reduces the cost and power requirements for core-based CNN implementations. In particular, by reducing the number of cores, each chip may be simplified, and the number of physical cores may be reduced, thereby reducing the resources necessary for fabrication. Likewise, during operation, fewer cores need be powered, leading to a reduction in overall power consumption for a given task.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 axons, and 256 configurable neurons. In such embodiments, there are 256×256=65,536 synapses forming a crossbar. Information flows from axons 101 to the neurons 104, modulated by the synapses 103. In various embodiments, the synapses may be binary, and may be associated with synaptic weights.

Figure 2:
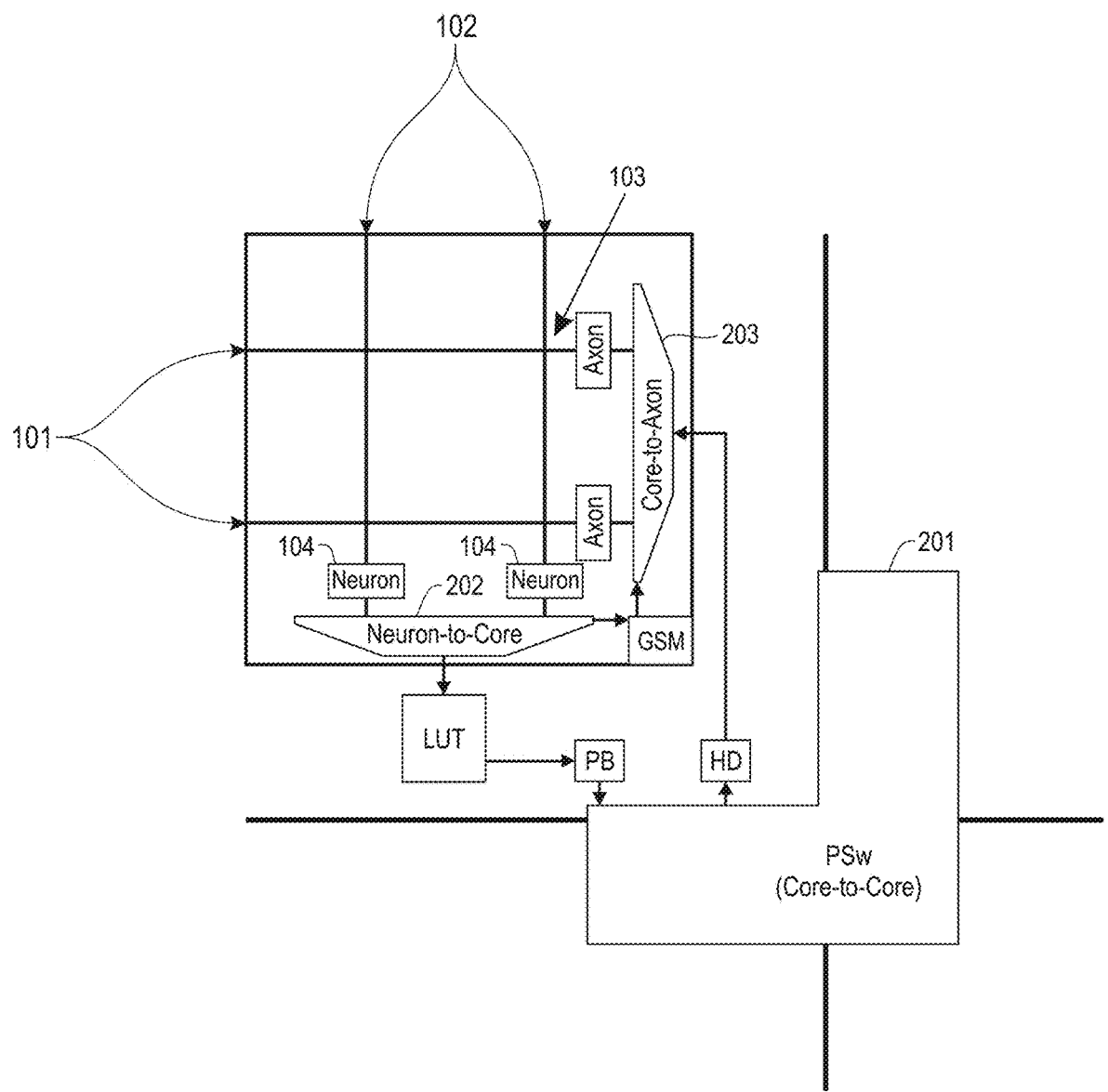
FIG. 2 depicts a neurosynaptic core and mesh router according to embodiments of the present disclosure.

In some embodiments a plurality of neurosynaptic cores are tiled on a chip. In an exemplary embodiment, a 64 by 64 grid of cores is tiled, yielding 4,096 cores, for a total of 1,048,576 neurons and 268,435,456 synapses. In such embodiments, neurons, synapses, and short-distance connectivity are implemented by the core circuit. Long-distance connectivity is logical. An exemplary embodiment is depicted in FIG. 2. Mesh router 201 provides communication between cores. Also on a given core, neuron to core 202 and core to axon 203 communication links are provided.

In various embodiments, a chip may be implemented in a custom ASIC. In general, the cores process in parallel, forming an asynchronous circuit. In various embodiments, a switched network is provided for transferring address packets among cores.

Figure 3:
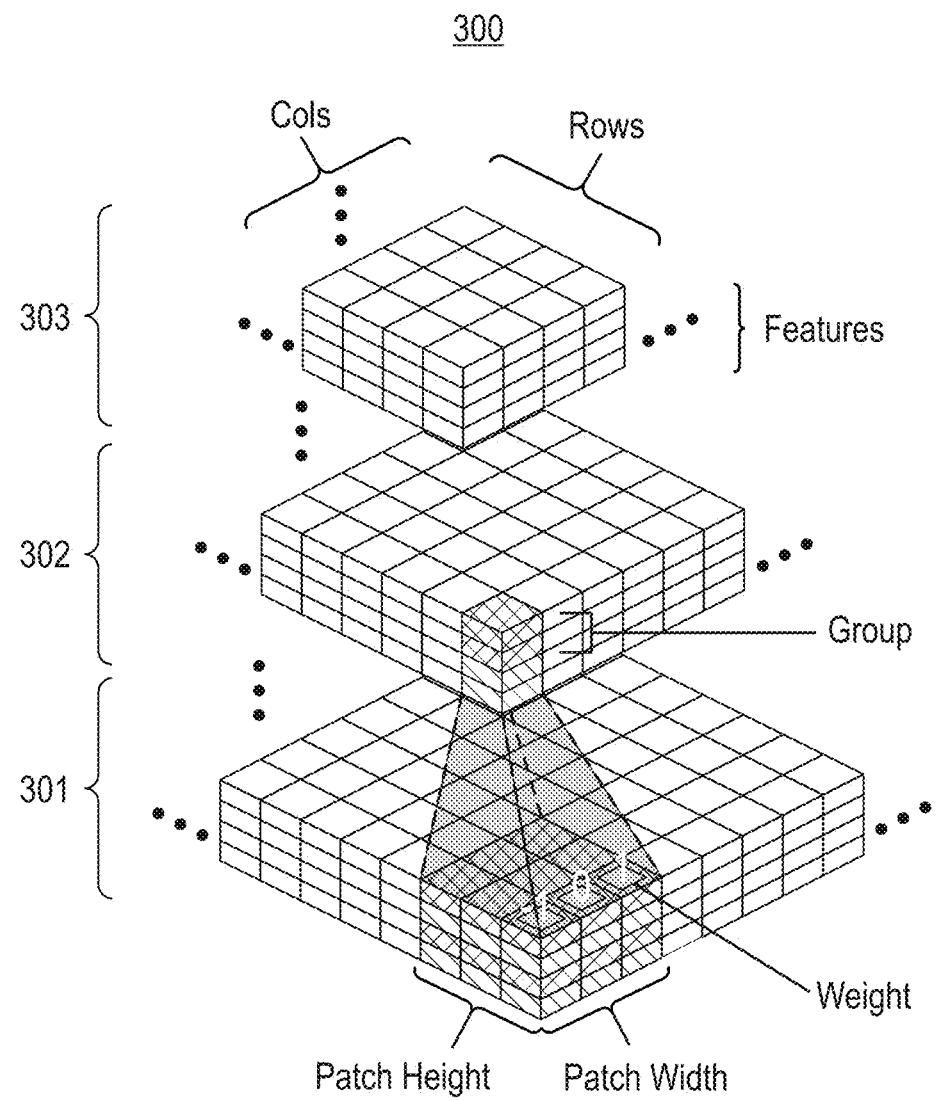
FIG. 3 depicts an exemplary convolutional neural network according to embodiments of the present disclosure.

With reference now to FIG. 3, an exemplary convolutional neural network is illustrated. In general, a deep convolutional network is a multilayer feedforward neural network, whose input is typically image-like and whose layers are neurons that collectively perform a convolutional filtering of the input or a prior layer. Neurons within a layer are arranged in two spatial dimensions, corresponding to shifts in the convolution filter, and one feature dimension, corresponding to different filters.

Network 300 includes layers 301 . . . 303. Each layer outputs a stack of 2D feature maps (rows×columns×features) generated by convolving a stack of 2D filters with the feature maps of its input layer. Each neuron in, e.g., layer 302 has a topographically aligned filter support region in layer 301. Adjacent features have their receptive field shifted in the input layer by the number of pixels in the stride. A layer can be divided into multiple groups along the feature dimension, where each group has a filter support region that covers a different set of features in the input layer.

To cover the full input space, each layer is partitioned along the feature dimension into one or more identically sized groups, where each group applies its spatial filters to a different non-overlapping subset of input features. Input features are evenly divided among and to the groups of a layer. Each layer is parameterized by the number of groups that divide its input space, and the number of feature maps that are being output. In a mapping of a CNN to cores, all neurons in the same core are members of the same group, filtering input from the same features. An input patch is a portion of the input that is covered by the layer's filter when applied to one convolution location. A patch contains patch height×patch width×feature group input cells.

In various embodiments, global core count optimization is provided in three phases. In a first phase, all network layers are trimmed to their effective receptive fields. In a second phase, global optimization of layer to cores layout is performed. In a third phase, zero-padding inputs are trimmed.

Figure 4A:
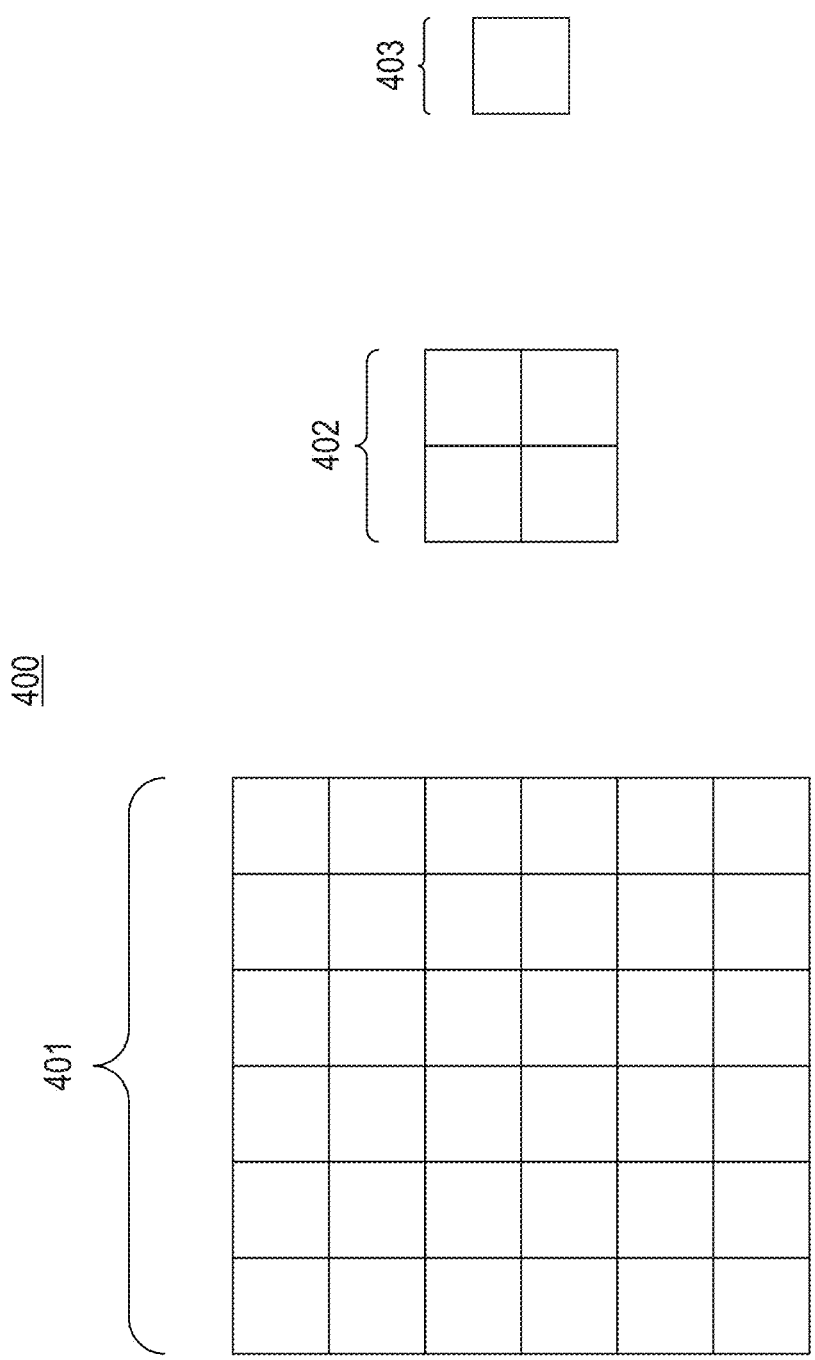
FIGS. 4A-B depict exemplary layouts of multiple layers of a convolutional neural network according to embodiments of the present disclosure.
Figure 4B:
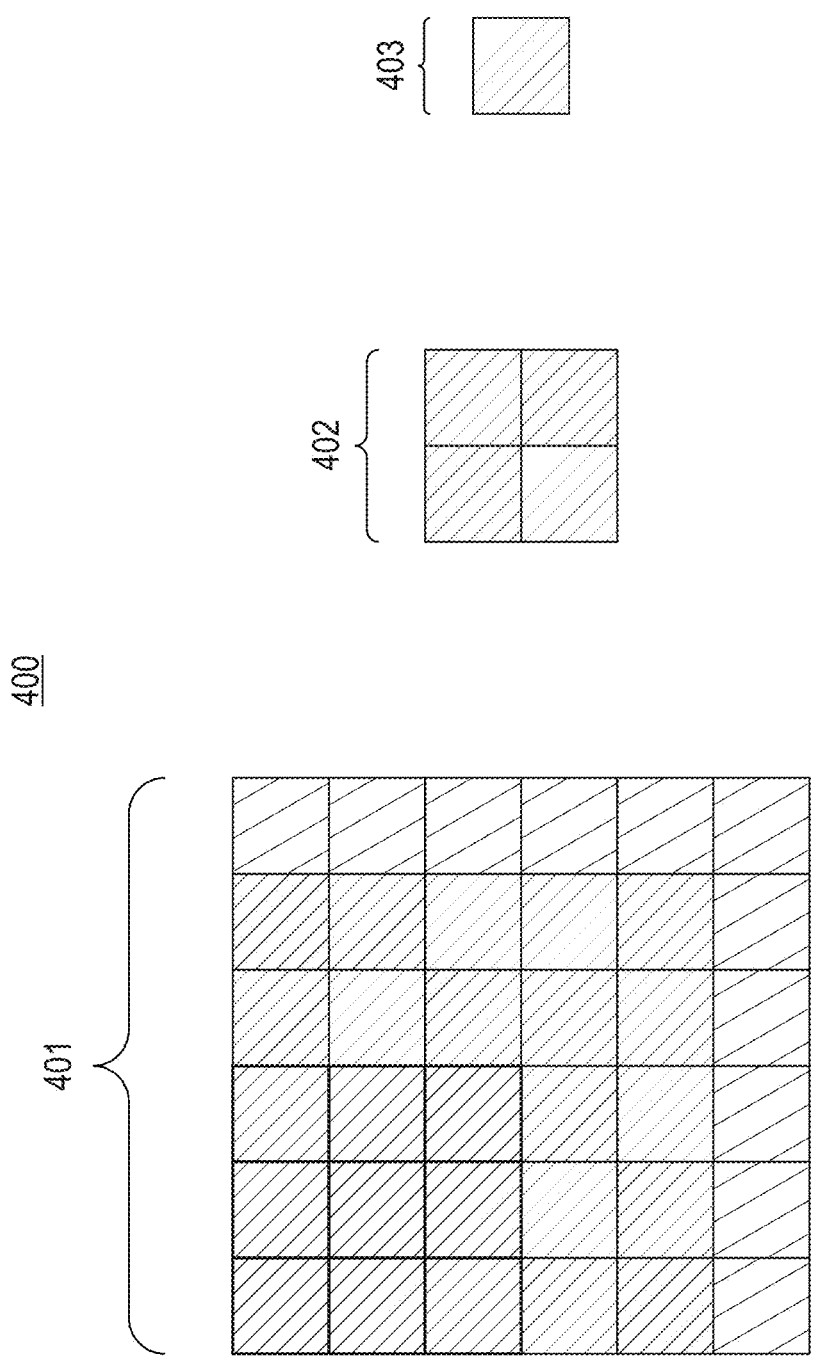

Referring to FIGS. 4A-B, an exemplary first stage of global core count optimization is illustrated according to embodiments of the present disclosure. Exemplary network 400 includes layers 401 . . . 403. In this network, layer 401 has a 6×6 input, a 3×3 filter, and stride of 2×2. Accordingly, its output to layer 402 is 2×2 (number of features is omitted for clarity). Layer 402 has a 2×2 input, a 2×2 filter, and stride of 1×1. Accordingly, its output to layer 403 is 1×1.

In various embodiments, each layer is trimmed to its receptive field. Referring to FIG. 4B, projecting back to layer 401, its receptive field is 5×5. Hence, there is no need to process (or layout) row 6 and col 6 in layer 401.

Figure 5:
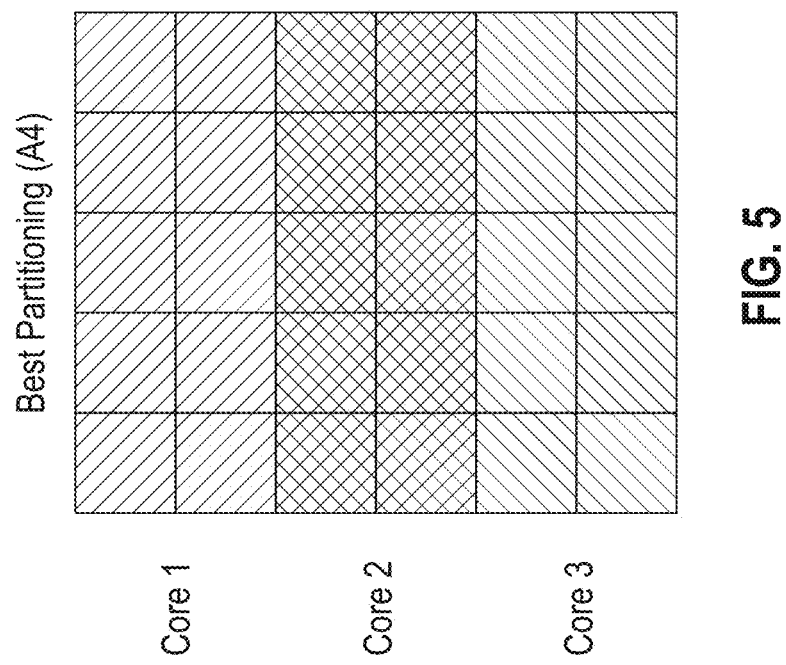
FIG. 5 depicts an exemplary partition of a convolutional neural network among a plurality of neural cores according to embodiments of the present disclosure.

Referring to FIG. 5, an exemplary layout of one layer is illustrated according to embodiments of the present disclosure. In this example, the optimal layout is determined for a 7×5×8 input (pictured, with feature dimension not shown for clarity).

Multiple overlapping patches are packed together on one core. There are multiple possible configurations to pack patches onto cores. Each configuration requires a certain number of cores. The dimensions of the input region that can be covered by a single core is determined by the following: W×H×inF<=128, where W>=Patch width, H>=Patch height, and inF=Input features per group; and no. output locations×outF×Copies<=256, where outF=Output features per group and Copies is the number of neurons allocated to compute the same output, for increased fan-out. In an exemplary embodiment based on EEDN and TrueNorth, 2 axons are provided per input.

For example, if patch width=2, patch height=2, stride=1, inF=8, outF=8, and no. input copies=1, then a naive layout can be given as in the first column of Table 1. In this configuration, each core computes only one output, corresponding to one input patch. Twenty-four cores are required to cover the entire input frame. Furthermore, the overlap between neighboring patches requires the use of splitter cores, to replicate each input cell for all the cores that compute patches that contain a given cell. The result is an inefficient implementation using 30 cores.

Given the same constraints, Table 1 provides several additional layouts (denoted A1 . . . A14). These alternative configurations for the 7×5×8 input differ by the core's input region and hence number of patches assigned to the core. For example, in A1 3×3 input region is assigned to each core. This region contains 4 partially overlapping patches of 2×2. Only 6 cores are required to cover the input, plus 4 splitter cores, for a total of 10 cores.

From Table 1, it may be seen that for a 7×5×8 input, A8 is optimal and will require 6 cores, 3 cores for the convolution and 3 cores for generating duplicate input copies. However, the Naïve method uses 30 cores to perform the same convolution.

TABLE 1

| | Naive | A1 | A2 | A3 | A4 | A5 | A6 | A7 | A8 | A9 | A10 | A11 | A12 | A13 | A14 |
|---|---|---|---|---|---|---|---|---|---|---|---|---|---|---|---|
| H | | | | | | | | | | | | | | | |
| W | 2 | 3 | 4 | 3 | 4 | 5 | 2 | 4 | 5 | 2 | 3 | 2 | 3 | 2 | 2 |
| inF, outF | 8 | 8 | 8 | 8 | 8 | 8 | 8 | 8 | 8 | 8 | 8 | 8 | 8 | 8 | 8 |
| W*H*inF | 32 | 72 | 128 | 48 | 64 | 80 | 48 | 96 | 120 | 64 | 96 | 80 | 120 | 96 | 112 |
| Core Out | 1×1 | 2×2 | 3×3 | 1×2 | 1×3 | 1×4 | 2×1 | 2×3 | 2×4 | 3×1 | 3×2 | 4×1 | 4×2 | 5×1 | 6×1 |
| Conv Cores | 24 | 6 | 4 | 12 | 12 | 6 | 12 | 6 | 3 | 8 | 4 | 8 | 4 | 8 | 4 |

TABLE 1-continued

|  | Naive | A1 | A2 | A3 | A4 | A5 | A6 | A7 | A8 | A9 | A10 | A11 | A12 | A13 | A14 |
|---|---|---|---|---|---|---|---|---|---|---|---|---|---|---|---|
| Splitter Cores | 6 | 4 | 3 | 5 | 5 | 4 | 5 | 4 | 3 | 4 | 3 | 4 | 3 | 4 | 4 |
| Natural Copies | 32x | 8x | 3x | 16x | 10x | 8x | 16x | 5x | 4x | 10x | 5x | 8x | 4x | 6x | 5x |

When optimizing layouts of multiple layers, the effective size of each layer is determined by the effective size of the other layers. The computation of effective layer dimensions requires two passes. In a first pass, the output layer dimensions are determined from the input layer forward to the output layer. In a second pass, the receptive field size and coverage in preceding layers is determined backwards from output layer to input layer. Cores will be allotted only to the effective regions in the layers, and the effective regions will be considered for the optimization process. The number of input copies required for each layer is determined by its chosen layout.

For a multi-layer network, each layer may have several possible layouts based on the layer effective dimensions, patch size and stride, number of output features, and the number of input copies. For embodiment using TrueNorth, each core has 256 neurons and a small subset of neurons may be enough to perform the convolution for the mapped input region. However, the next layer often requires multiple copies of the current layer output features due to overlap of convolution windows. As the duplication of output features requires additional cores, it is prudent to generate multiple copies of the output features simultaneously by replicating the crossbar and using the unused neurons in the convolution cores. In most configurations, the core's 256 neurons can be utilized to compute more than a one copy of the output. These copies of the output tensor are referred to as the native copy or natural copy to distinguish from additional copies created by a splitter core. Table 1 shows the number of possible native copies for a chosen layout in the above example. The number of natural copies is computed as 256/outF/Output. The number of natural copies produced by each layer is determined by its chosen layout, and is used to reduce, and sometimes eliminate, the number of splitters required for the next layer, thereby reducing the overall number of cores.

For a multi-layer network, each layer may have several possible layouts, and the number of copies required for each layer is determined by its chosen layout. The chosen layout determines the number of convolution cores and the number of natural copies for the next layer. When choosing the layout for a layer, there may be a tradeoff between the number of cores and number of natural copies it provides for the next layer. Hence, a global optimization is required for a multi-layer network.

Figure 6:
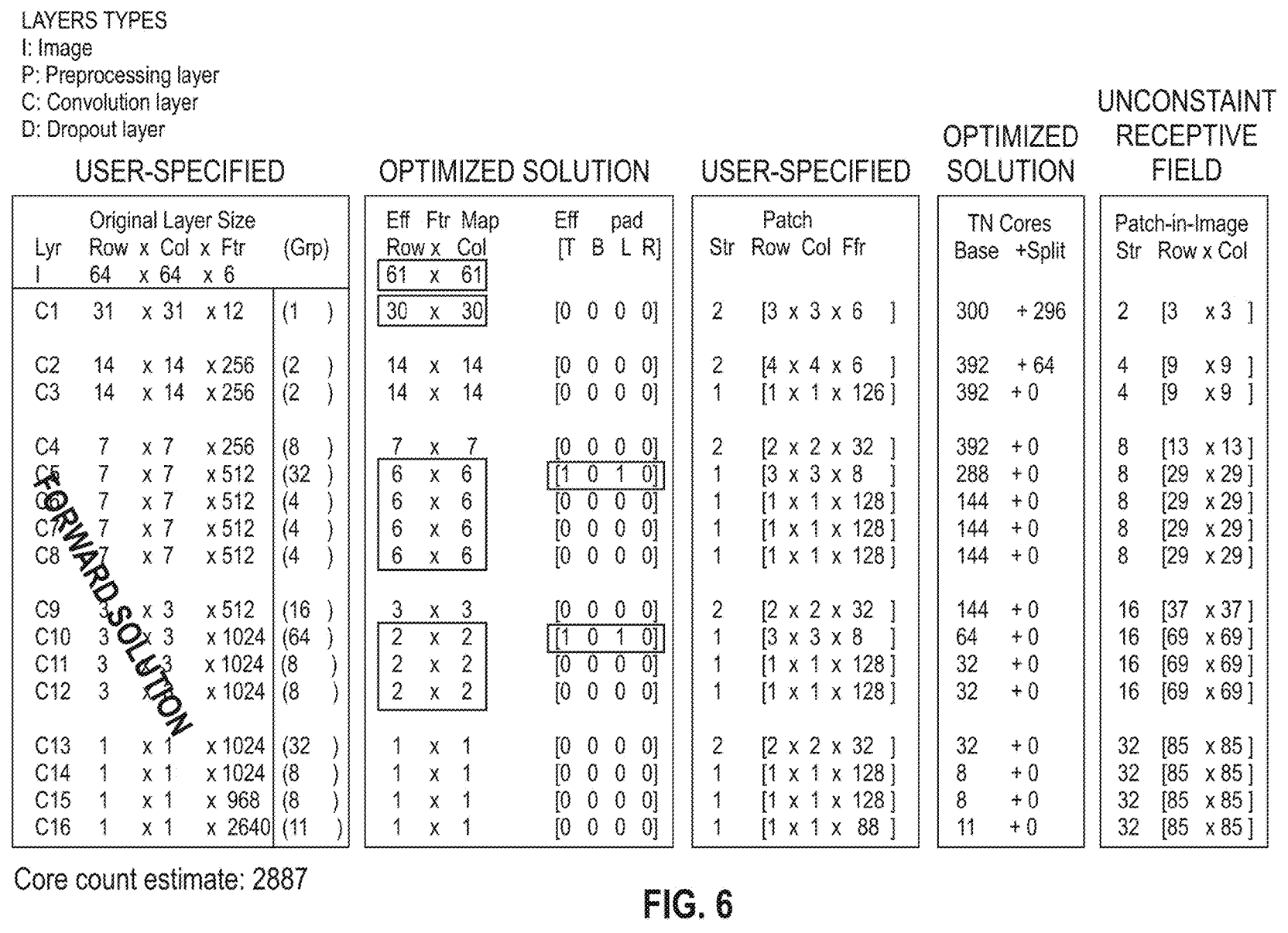

Referring to FIG. 6, an exemplary mapping of sixteen layers of a CNN to TrueNorth cores is illustrated. In this example, for each of the sixteen layer (C1 . . . C16), the row, column, and filter dimensions are given for a naïve forward solution. It will be seen that the optimized solution reduces the effective feature map dimension (reductions outlined). The result is a reduction in cores required, both for the base network and for splitters, as illustrated.

In various embodiments, a plurality of layout alternatives are computed for each layer of a neural network. The number of cores, the required number of input copies, and number of natural copies are computed for each layout alternative.

A plurality of combinations of layouts may be determined, accounting for all layers. For each combination, the number of convolution cores and the number of required splitters are computed. For each pair of connected layers, if the number of natural copies in the producer layer is smaller than the number of required input copies in the consumer layer, then the number of required splitters between these two layers is computed. A splitter layer is required between two convolution layers if the number of input copies required for the next layer is larger than the natural copies provided by the previous layer. The total number of cores required for each combination is computed. Given these parameters, the lowest core count for the overall network can be identified under the given constraints. The combination with the lowest core count provides the optimum solution for partitioning.

While the number of configuration per layer can be small (13 in the above example), the total number of possible combinations of all layers may be up to the product of the numbers of configurations of all layers. It might be too large to allow evaluation of all possible combinations. Optimization algorithms and heuristics may be applied to sample and search the huge combinations space for an optimal solution.

Figure 7:
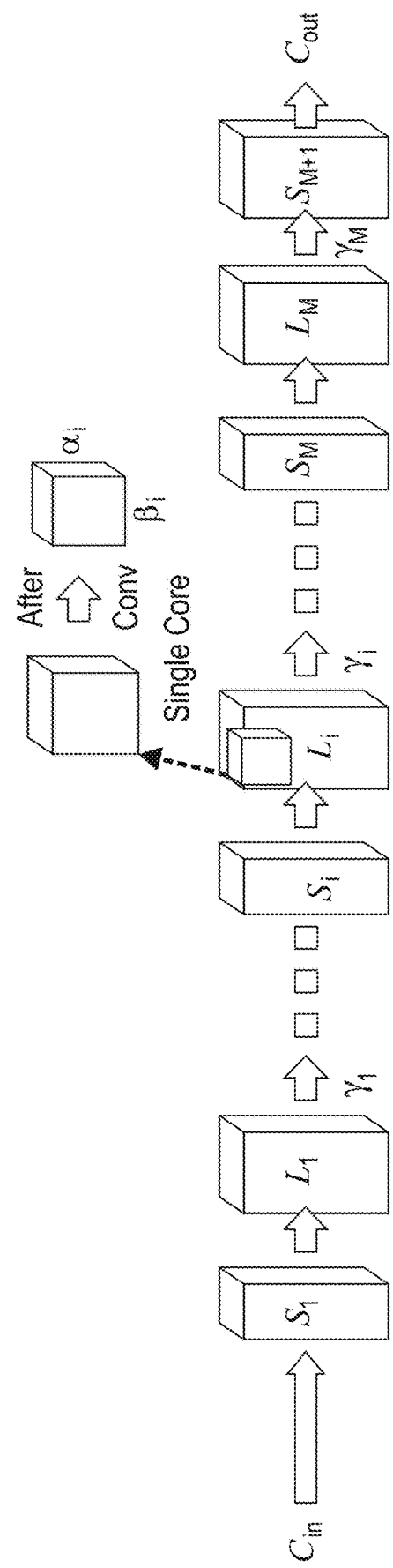
FIG. 7 depicts an exemplary core layout of a convolutional neural network according to embodiments of the present disclosure.

Referring to FIG. 7, the core optimization problem in terms of a Multi-layer network on a system of neuromorphic cores is illustrated according to embodiments of the present disclosure. In this example, $L_i$ corresponds to cores used for CNN layers (computation), and $S_i$ corresponds to cores used as splitters to support the required fan-out between layers. M corresponds to the number of layer in the network. $p_i$ is a 2-element vector [patch height, patch width] representing the patch size for the i-th layer. $s_i$ corresponds to the stride length for the i-th layer. $effYS_i$ corresponds to the effective output feature map size [height, width] for the i-th layer. $effPad_i$ corresponds to the effective padding size at the i-th layer. This is a 4-element vector representing the effective padding at [top bottom left right] sides of the specified layer. $inF_i$ corresponds to the number of input feature maps of the ith layer. $outF_i$ corresponds to the number of output feature maps of the i-th layer. $G_i$ corresponds to the number of groups in the ith layer. $maxNC_i$ corresponds to the maximum number of natural copies allowed from the i-th layer, thereby limiting the fan-out of CNN cores.

PF is a precision factor representing the number of neurons allocated for each input. $N_n$ corresponds to the number of neurons per core. $N_a$ corresponds to the number of axons per core. $C_{in}$ corresponds to the number of copies of input data. $C_{out}$ corresponds to the number of output copies required from the last layer. maxD corresponds to the maximum delay or latency of the system. $\alpha_i$ and $\beta_i$ correspond to the height and width of the output convoluted region in a single core of the i-th layer. $\gamma_i$ corresponds to the number of natural copies generated from the i-th layer.

In view of the above formulation, an objective function may be defined to minimize the total cores as in Equation 1.

$$\sum_{i=1}^{M} L_i + \sum_{i=1}^{M+1} S_i \quad \text{Equation 1}$$

In Equation 1, convolution cores allotted to the ith convolution layer are given by Equation 2

$$L_i = \left\lceil \frac{effYS_i(1)}{\alpha_i} \right\rceil * \left\lceil \frac{effYS_i(2)}{\beta_i} \right\rceil * G_i \qquad \text{Equation 2}$$

Cores allotted to the ith splitter layer are given in Equation 3, assuming $\gamma_0 = C_{in}$. f and g are deterministic functions.

$$S_i = \qquad \text{Equation 3}$$
$$\begin{cases} f(\alpha_i, \beta_i, \gamma_{i-1}, p_i, s_i, effYS_{i-1}, effPad_i, inF_i) & \text{for } i = 1 : M \\ g(effYS_M, outF_M, \gamma_M, C_{out}) & \text{for } i = M+1 \end{cases}$$

The optimization problem may then be formulated as a Mixed Integer Non-linear Program (MINLP) with 3M integer variables. The optimum values of $\alpha_i$, $\beta_i$ and $\gamma_i$ are computed for all i=1:M given the below constraints.

$\alpha_i * \beta_i * \gamma_i * outF_i \leq N_n, \forall i = 1:M$ $[(\alpha_i - 1)s_i + p_i(1)] * [(\beta_i - 1)s_i + p_i(2)] * PF * inF_i \leq N_a, \forall i$ $\alpha_i \leq effYS_i(1), \forall i = 1:M$ $\beta_i \leq effYS_i(2), \forall i = 1:M$ $\gamma_i \leq maxNC_i, \forall i = 1:M$ $\Sigma_{i=1}^{M+1} I_{\{S_i > 0\}} + M \leq maxD$ $\alpha_i, \beta_i, \gamma_i \varepsilon \mathbb{N}^+, \forall i = 1:M \qquad \text{Equation 4}$ $\mathbb{N}^+$ is a finite set of positive integers and I is an indicator function, defined by Equation 5.

$$I_{\{x>0\}} = \begin{cases} 1, & \text{if } x > 0 \\ 0, & \text{if } x \leq 0 \end{cases} \qquad \text{Equation 5}$$

The constrained optimization problem can then be solved by a variety of MINLP solving techniques. For example, in various embodiments, CPLEX or MINOS are used.

In some embodiments, an exhaustive search is performed. In such embodiments, all alternatives are generated for each layer. For each potential combination of alternatives, the number of cores is computed. Based on this computation, the alternative with the minimum number of cores is selected.

In other embodiments, an heuristic is applied to find an optimum solution. In some such embodiments, redundant combinations are eliminated, thereby reducing necessary computation. In some such embodiments, layers having a single potential layout are identified. Such layers act to decouple the layers before and after so that each of these two groups can be optimized independently.

In various embodiments, layout is provided for zero-padded layers. In a zero-padded layer, zero-padded inputs can be ignored as those axons never receive an input. Accordingly, additional layouts emerge considering only unpadded inputs. For example, if Patch width=3, Patch height=3, Stride=1, inF=8, outF=8 and number of input copies=1, then the possible layouts are given in Table 2. For a 4×4×8 input after 0-padding, the optimal layout is given by alternative B1, which requires only 2 cores.

TABLE 2

|  | Naive | A1 | A2 | A3 | B1 |
|---|---|---|---|---|---|
| H | 3 | 3 | 4 | 3 | 4 |
| W | 3 | 4 | 4 | 5 | 4 |
| inF, outF | 8 | 8 | 8 | 8 | 8 |
| W * H * inF | 72 | 108 | 128 | 120 | 128 |
| Core Output | 1 × 1 | 1 × 2 | 2 × 2 | 1 × 3 | 4 × 4 |
| Convolution Cores | 16 | 8 | 4 | 8 | 1 |
| Splitter cores | 7 | 4 | 3 | 4 | 1 |
| Natural Copies | 32× | 16× | 8× | 10× | 2× |

Figure 8A:
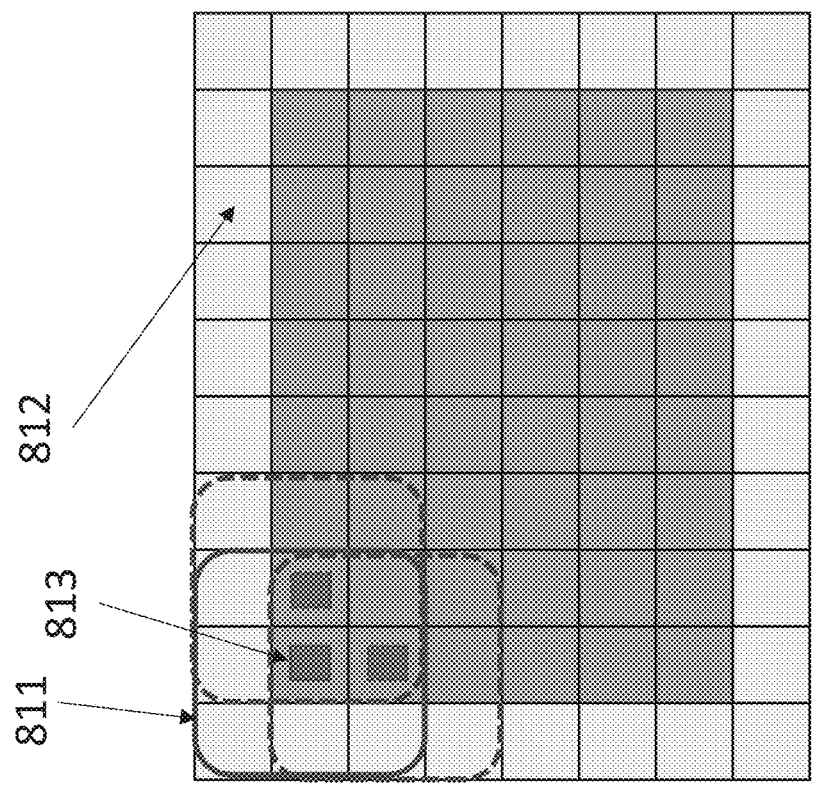
FIGS. 8A-C illustrate exemplary core layouts of a convolutional neural network according to embodiments of the present disclosure.
Figure 8B:
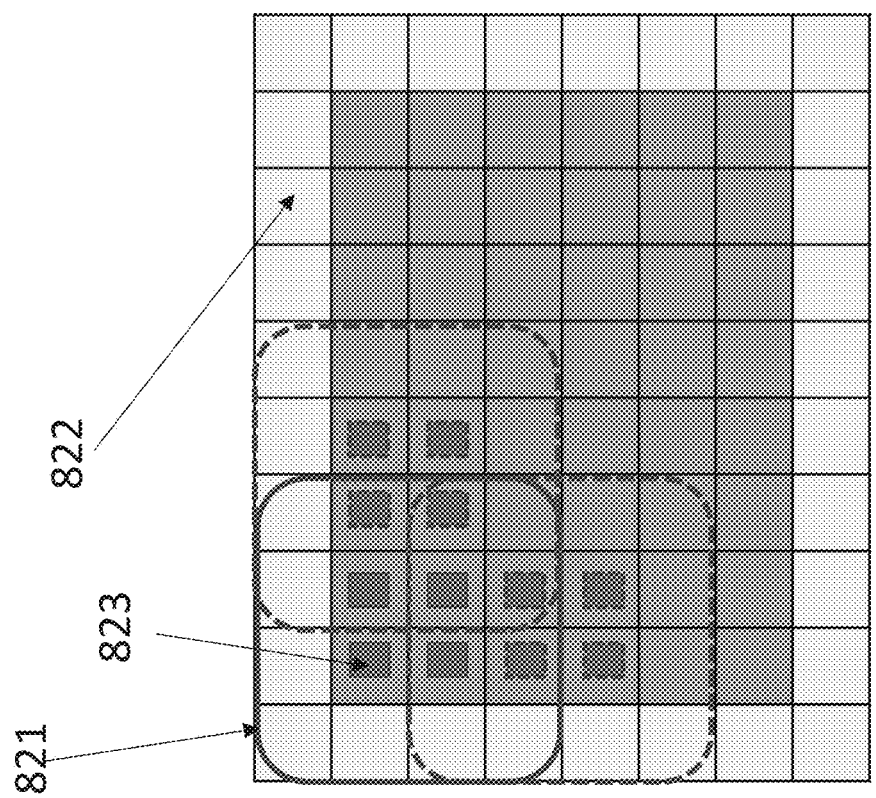
Figure 8C:
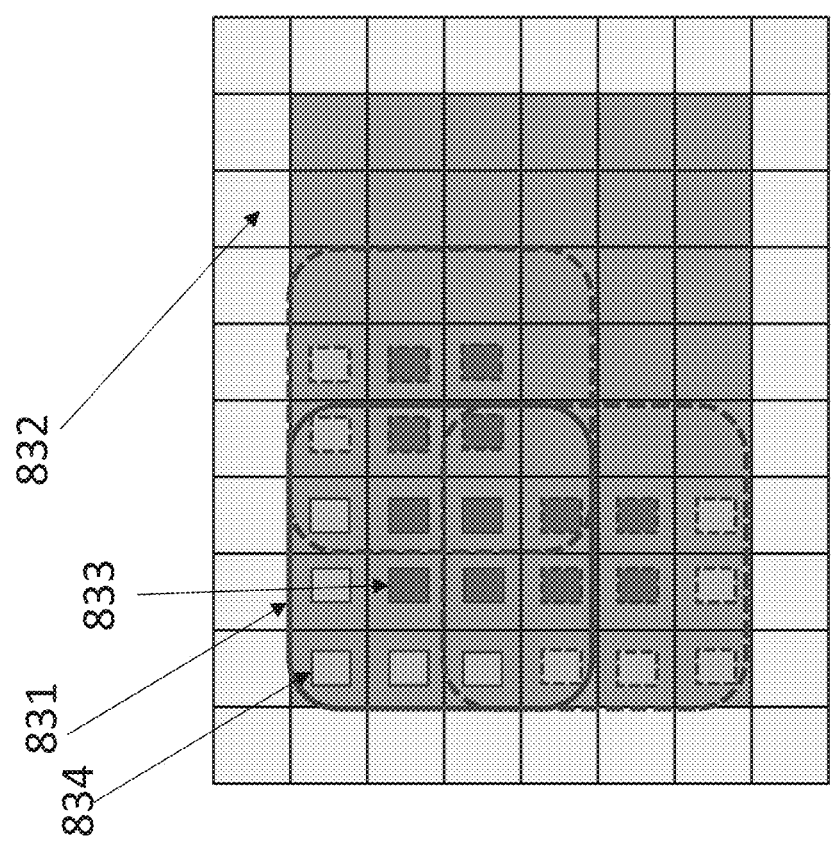

FIGS. 8A-C illustrate the efficiencies realize when elimination of zero padded input cells is applied to a layer with a larger input dimensions. FIG. 8A shows the naïve layout, computing one output location 813 from a 3×3 input 811 on each core. This is further optimized in FIG. 8B, where 4 output locations 823 are computed on each core. However, zero-padded boundary 822 is still included in the input 821. In FIG. 8C, the core input 831 does not contain the padding 832 and therefore this core computes only its 4 center outputs 833, but also 5 additional outputs 834. Those boundary cores would produce more output locations than the inner cores, therefore reducing the total number of cores required for the layer. Cores near the boundary would have different crossbar connectivity and/or different neuron properties than inner cores. The different connectivity and/or different neuron properties compensates for the removed, zero-padded, inputs.

For zero-padded layers, the feasible region is expanded. In particular, additional layout options are available with non-padded features. Such a layout satisfies homogeneity if the group of non-padded features fits in a single core. This is common in deeper layers and has the potential to save large numbers of cores as the number of output features and groups are generally large. In this case, the feasible region or the set of alternatives for the layer will be expanded as given in Equation 6 where $\mathbb{S}_i$ is the set of alternatives with the previous constraints of Equation 4.

$$\{\alpha_i, \beta_i, \gamma_i \in \mathbb{S}_i\} \cup \{\alpha_i = effYS_i(1), \qquad \text{Equation 6}$$
$$\beta_i = effYS_i(2),$$
$$\gamma_i \leq \min\left(maxNC_i, \frac{N_n}{effYS_i(1) * effYS_i(2) * outF_i}\right)\}$$

In various embodiments, additional optimizations may be applied.

In some embodiments, variable block size may be provided. In such embodiments, an input area may be covered with tiles of several different sizes, as oppose to all tiles being one size. This requires generation and evaluation of additional alternatives.

In some embodiments, location-dependent natural copies are generated. In such embodiments, a different number of natural copies is created per location, depending on how many copies are needed at that location in the next layer, rather than producing the same number of copies everywhere and leaving some copies unused at those locations.

In some embodiments, zero-padded inputs are ignored. In such embodiments, for all layers with zero-padding, padding areas are removed from the input. To compensate, different block sizes or variable splitting or a combination of both may be used at the boundary areas. This saves rows and/or cols of input for the layer.

As described above, in various embodiments, optimized partitioning of multi-layer networks in core-based neurosynaptic architecture is provided. The effective output-induced receptive field (ORF) of a given network is computed at each of its layers. Any parts of layers which fall outside of the ORF are trimmed. For the remaining network, for each layer, a plurality of alternative layouts is computed. For each feasible combination of layouts, the required splitters are computed. The resulting overall core count is then computed. The alternative which minimizes the core count is selected as the most space-efficient. Further optimization is achieved by ignoring the zero-padded inputs. For any 0-padded layers, eliminate the axons corresponding to the padded areas which are within the ORF, as those axons never receive any input. The neuron equations may then be modified to compensate. Variable block size selection and location-dependent splitting may likewise be applied to save more cores.

Figure 9:
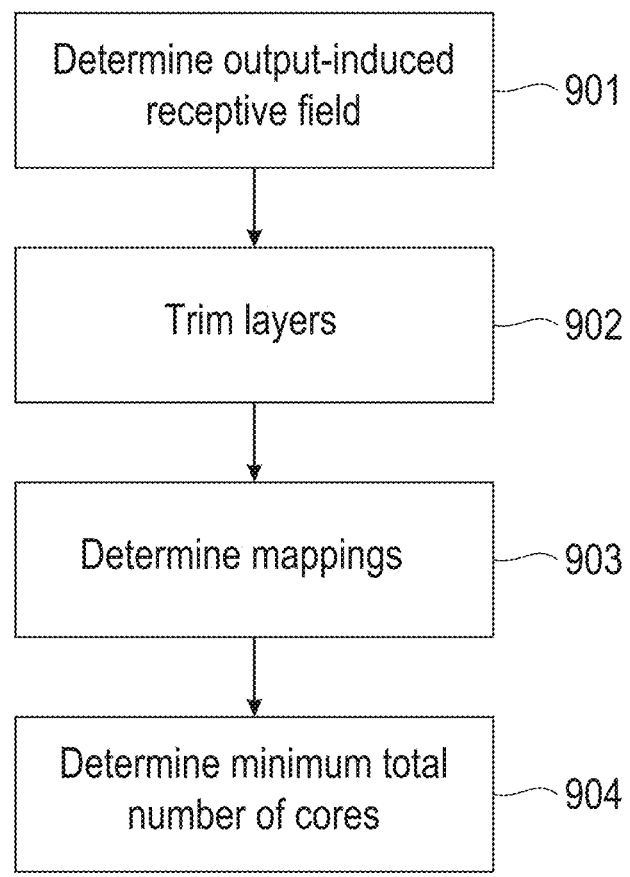
FIG. 9 illustrates a method of hardware optimization of neural networks according to embodiments of the present disclosure.

Referring now to FIG. 9, a method of hardware optimization of neural networks is illustrated. At 901, an output-induced receptive field of each of a plurality of layers of a neural network is determined. At 902, from each of the plurality of layers any portions of their respective input that falls outside their respective output-induced receptive field are trimmed. At 903, for each of the plurality of layers, a plurality of mappings of the layer to physical neurosynaptic cores are determined. At 904, a mapping is determined having a minimum total number of cores required for the neural network based on the plurality of mappings.

Figure 10:
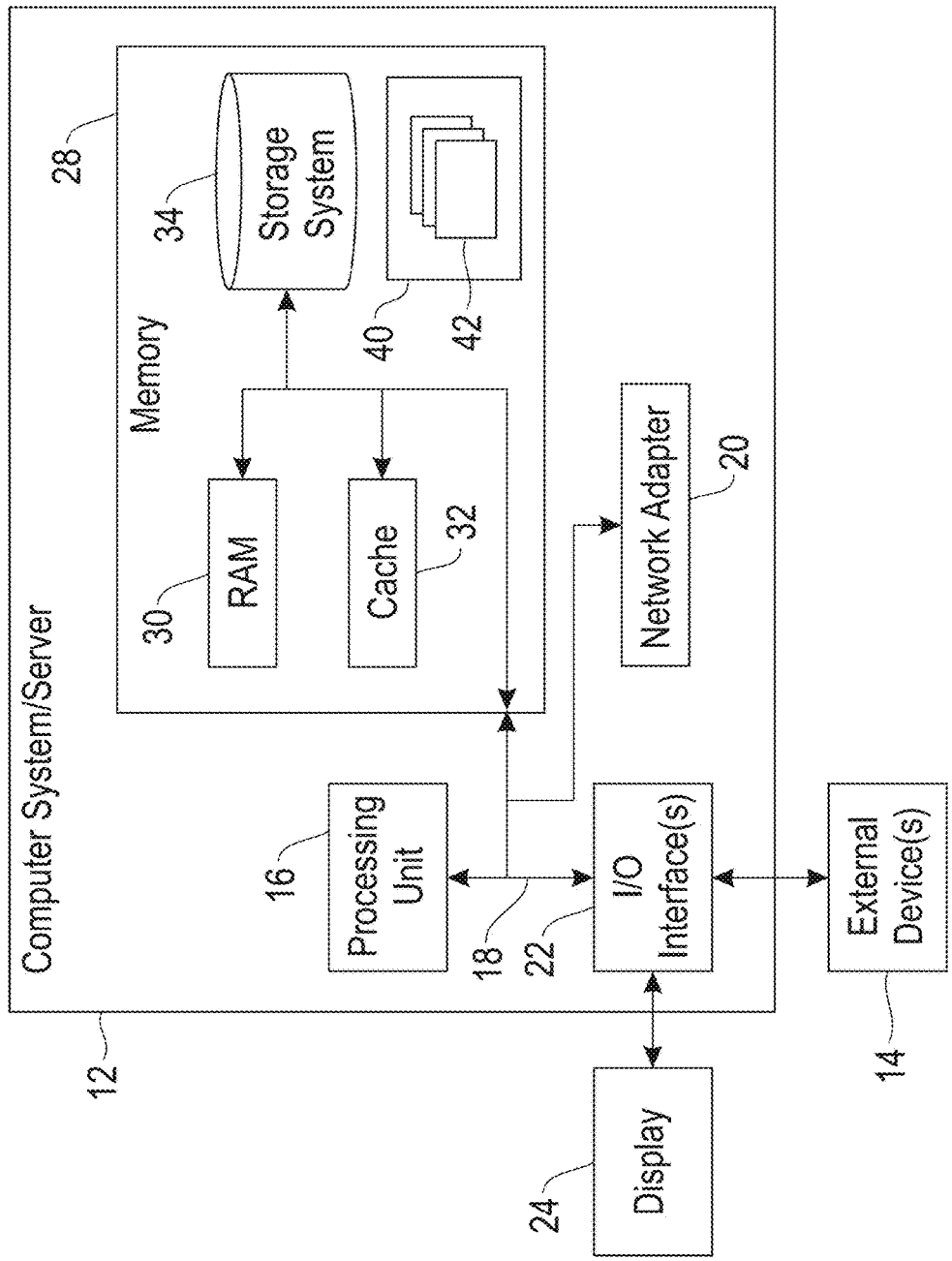
FIG. 10 depicts a computing node according to an embodiment of the present disclosure.

Referring now to FIG. 10, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   determining an output-induced receptive field of each of a plurality of layers of a neural network;
   trimming from each of the plurality of layers any portions of their respective input that falls outside their respective output-induced receptive field;
   determining, for each of the plurality of layers, a plurality of mappings of each layer to physical neurosynaptic cores;
   determining a mapping having a minimum total number of cores required for the neural network based on the plurality of mappings, wherein determining the minimum total number of cores comprises optimizing a mixed integer non-linear program; and
   determining a core-count minimizing layout for each of the layers in the network.

2. The method of claim 1, wherein determining the minimum total number of cores comprises determining a number of splitter layers necessary for each of the plurality of mappings.

3. The method of claim 2, wherein each splitter layer is disposed between two convolution layers.

4. The method of claim 1, further comprising:
   trimming zero-padding from each of the plurality of layers.

5. The method of claim 1, further comprising:
   executing the neural network on the minimum total number of cores.

6. The method of claim 5, further comprising:
   performing mathematical optimization with core minimization as an objective and core capacity and system latency as constraints.

7. The method of claim 1, wherein the neural network comprises a convolutional neural network.

8. The method of claim 2, wherein determining the minimum total number of cores comprises determining a core-count minimizing number of natural copies necessary for each of the plurality of mappings.

9. The method of claim 8, wherein determining the minimum total number of cores further comprises determining a core-count minimizing number of splitter cores necessary for each of the plurality of mappings.

10. A system comprising:
    a computing node comprising a computer readable storage medium having program instructions embodied therewith, the program instructions executable by a processor of the computing node to cause the processor to perform a method comprising:
      determining an output-induced receptive field of each of a plurality of layers of a neural network;
      trimming from each of the plurality of layers any portions of their respective input that falls outside their respective output-induced receptive field;
      determining, for each of the plurality of layers, a plurality of mappings of each layer to physical neurosynaptic cores;
      determining a mapping having a minimum total number of cores required for the neural network based on the plurality of mappings,
      wherein determining the minimum total number of cores comprises optimizing a mixed integer non-linear program; and
      determining a core-count minimizing layout for each of the layers in the network.

11. The system of claim 10, wherein determining the minimum total number of cores comprises determining a number of splitter layers necessary for each of the plurality of mappings.

12. The system of claim 11, wherein each splitter layer is disposed between two convolution layers.

13. The system of claim 10, the method further comprising:
    trimming zero-padding from each of the plurality of layers.

14. The system of claim 10, the method further comprising:
    executing the neural network on the minimum total number of cores.

15. The system of claim 14, the method further comprising:
    performing mathematical optimization with core minimization as an objective and core capacity and system latency as constraints.

16. The system of claim 10, wherein the neural network comprises a convolutional neural network.

17. A computer program product for hardware optimization of neural networks, the computer program product comprising a computer readable storage medium having program instructions embodied therewith, the program instructions executable by a processor to cause the processor to perform a method comprising:
    determining an output-induced receptive field of each of a plurality of layers of a neural network;
    trimming from each of the plurality of layers any portions of their respective input that falls outside their respective output-induced receptive field;
    determining, for each of the plurality of layers, a plurality of mappings of each layer to physical neurosynaptic cores;
    determining a mapping having a minimum total number of cores required for the neural network based on the plurality of mappings, wherein determining the minimum total number of cores comprises optimizing a mixed integer non-linear program; and
    determining a core-count minimizing layout for each of the layers in the network.

* * * * *